United States Patent
Feng et al.

(10) Patent No.: US 10,534,282 B2
(45) Date of Patent: Jan. 14, 2020

(54) CHARGE ROLLER

(75) Inventors: Yi Feng, San Diego, CA (US); Stanley J. Kozmiski, Escondio, CA (US); Shao-Wei Li, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 655 days.

(21) Appl. No.: 14/375,767

(22) PCT Filed: Mar. 1, 2012

(86) PCT No.: PCT/US2012/027201
§ 371 (c)(1),
(2), (4) Date: Jul. 30, 2014

(87) PCT Pub. No.: WO2013/130084
PCT Pub. Date: Sep. 6, 2013

(65) Prior Publication Data
US 2015/0018182 A1  Jan. 15, 2015

(51) Int. Cl.
*G03G 15/02* (2006.01)
*F16C 13/00* (2006.01)
*G03G 15/10* (2006.01)

(52) U.S. Cl.
CPC ......... *G03G 15/0233* (2013.01); *F16C 13/00* (2013.01); *C08L 2203/20* (2013.01); *C08L 2666/52* (2013.01); *C08L 2666/55* (2013.01); *G03G 15/10* (2013.01)

(58) Field of Classification Search
None
See application file for complete search history.

(56) References Cited

U.S. PATENT DOCUMENTS

| 6,072,970 | A | * | 6/2000 | Barton | C08K 5/0025 |
|---|---|---|---|---|---|
| | | | | | 361/221 |
| 6,238,759 | B1 | | 5/2001 | Meece et al. | |
| 6,463,237 | B2 | | 10/2002 | Suda et al. | |
| 6,523,263 | B2 | | 2/2003 | Jo et al. | |
| 7,609,999 | B2 | | 10/2009 | Gila et al. | |
| 2001/0002382 | A1 | | 5/2001 | Jo et al. | |
| 2006/0252620 | A1 | | 11/2006 | Urano et al. | |
| 2006/0269327 | A1 | | 11/2006 | Mizumoto | |
| 2008/0247778 | A1 | | 10/2008 | Motokawa et al. | |

(Continued)

FOREIGN PATENT DOCUMENTS

| EP | 2180376 | 4/2010 |
|---|---|---|
| JP | 2004191961 | 7/2004 |
| JP | 2004271709 | 9/2004 |

(Continued)

OTHER PUBLICATIONS

JP 2008-216449, Mitsuru et al., English Machine Translation.*

(Continued)

*Primary Examiner* — Scott R. Walshon
*Assistant Examiner* — Elaine M Vazquez
(74) *Attorney, Agent, or Firm* — Dieker & Kavanaugh PC

(57) ABSTRACT

The present disclosure discloses a charge roller (1) particularly but not exclusively for charging a photoconductor in a liquid electro-photograph (LEP) image-forming apparatus. The charge roller includes a cured composition of an epichlorohydrin/ethylene oxide/allyl glycidyl ether terpolymer, a lithium salt and carbon black.

13 Claims, 3 Drawing Sheets

(56) References Cited

U.S. PATENT DOCUMENTS

2011/0123219 A1  5/2011  Gilmartin et al.
2011/0170909 A1  7/2011  Garcia

FOREIGN PATENT DOCUMENTS

| | | |
|---|---|---|
| JP | 2008216449 | 9/2008 |
| JP | 2008276021 | 11/2008 |
| JP | 2011141322 | 7/2011 |
| KR | 100854664 | 8/2008 |
| WO | WO 2010/039134 | 4/2010 |

OTHER PUBLICATIONS

JP 2011-141322, Naoki et al., English Machine Translation.*
Vanderbilt Chemicals, ALTAX Safety Data Sheet (2017) (Year: 2017).*
Atman Chemical Industry Co., Atnen ZDMC-75 (2012) (Year: 2012).*
RheinChemie, Products for the Rubber Industry, Second Edition (1999) (Year: 1999).*
Extended European Search Report for Appln No. 12869613.5 dated Sep. 9, 2015 (8 pages).

* cited by examiner

CHARGE ROLLER

BACKGROUND

A liquid electro-photograph (LEP) process begins with charging a photo-conductor. Scorotron devices are commonly used to impart electrons on the photo-conductor for the charging purpose. A drawback of scorotron devices resides in the environmentally dangerous ozone emission generated by the corona effect. A known alternative to scorotron devices is charge rollers. The present disclosure generally relates to a new charge roller, an apparatus particularly for performing a liquid electro-photograph (LEP) process and a method for the manufacture of the charge roller.

Rubber used to manufacture the charge rollers tested in FIGS. 1 to 4 is disclosed in the Examples.

DETAILED DESCRIPTION

Charge rollers typically comprise a conductive (usually steel) shaft core which is coated with a layer of a conductive rubber. In certain cases, the layer is further over coated to tailor roller surface properties.

Polyurethane (PU) is a common material used for the layer of conductive rubber in charge rollers. Since PU is not a conductor, a conductive salt is usually added to provide for rubber conductivity. Use of polyurethane is however not always satisfactory since PU may suffer with hydrolysis issues due to ambient humidity. The hydrolytic reaction may degrade PU rubber mechanical and other properties. Consequently, PU-based charge rollers may have a certain life limitation. A higher-than-desired cost-per-page (Cpp) may therefore be associated with their limited life span.

Hydrins (i.e. terpolymers of epichlorohydrin/ethylene oxide/allyl glycidyl ether) are another material used for layer of conductive rubber in charge rollers. Hydrins exist in different chemical grades, each grade having different amounts of the constitutive monomers blend and having specific physical and mechanical properties. Since hydrins are intrinsic (partially) conductive polymers, they are typically used without the addition of conductive agents. Conventional salt-free hydrins are used in charge rollers for low-end of the electro-photograph (EP) market such as in office laser printer or MFP with DC charging mode only. Those charge rollers cost no more than a few dollars, and are made as part of a toner cartridge. They are expected to last as long as the cartridge capacity which typically is no more than 20K impressions. However, conventional hydrin rollers are not always satisfactory when used in industrial LEP presses, especially those relying on AC charging mode, and which print at high speed with higher print quality (PQ). When used in these demanding conditions, conventional salt-free hydrin-based charge rollers showed drawbacks for example in terms of electrical performances and life span.

Figure 5A:
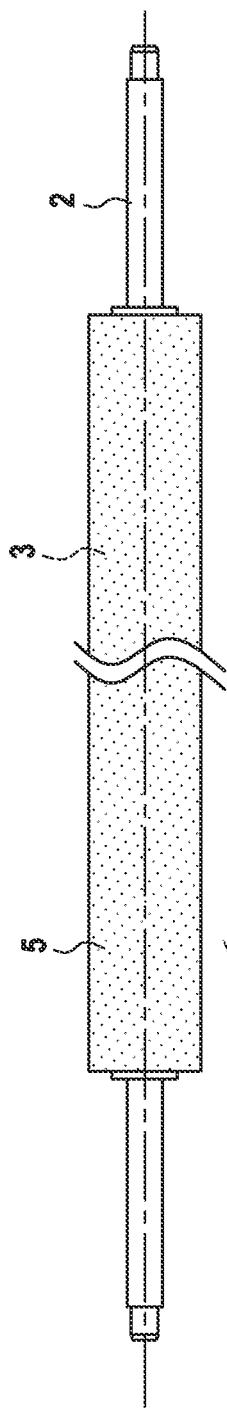
FIG. 5A is a view of a charge roller according to an embodiment of the invention.
Figure 5B:
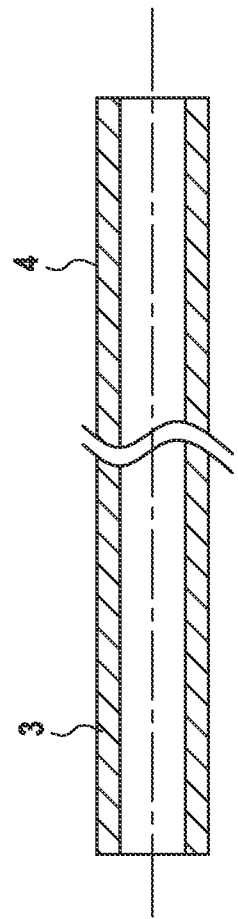
FIG. 5B is a sectional view of the hydrin layer of the charge roller of FIG. 5A.

Unless otherwise indicated and referring to FIGS. 5A and 5B, a charge roller 1 comprises an inner conductive shaft 2 (which may comprise an internal cavity) typically made of steel or aluminum, and a conductive layer 3 of a rubber disposed about said shaft 2 and extending along at least a portion of the length of said shaft. The layer 3 has an outer longitudinal surface 4 which may be further coated with a usually semi-conductive rubber coating 5. The conductivity of the rubber used for the coating 5 is typically lower than the conductivity of the rubber used for the layer 3. This is a solution to overcome unwanted sparkling of the charge roller when in contact with the photo-conductor. To achieve appropriate electrical performances of coating and coated layer it is possible to either use the same rubber for both the layer and the coating but with different doping conducting agents, and/or use different rubbers and/or a combination of the two strategies. The coating typically has a thickness comprised between a few microns till tens of millimeters.

Unless otherwise indicated, when used herein LEP or liquid electro-photograph process means a printing process which uses liquid toner to form images on paper or other print medium. LEP is often used for large scale commercial printing. The basic LEP printing process involves using a DC or AC charged charge roller to place an uniform electrostatic charge on a photoconductor, the photoconductive surface on a rotating drum for example, and exposing the photoconductor to light in the pattern of the desired printed image to dissipate the charge on the areas of the photoconductor exposed to the light. The resulting latent electrostatic image on the photoconductor is developed by applying a thin layer of liquid toner to the photoconductor. Liquid toner generally consists of charged toner particles dispersed in a carrier liquid (typically a hydrocarbon oil such as Isopar-L®, CAS No. 64742-48-9 available from Exxon Mobile). Below, the carrier liquid is also referred to as image oil or ink solvent. The charged toner particles adhere to the discharged areas on the photoconductor (discharged area development DAD) or to the charged areas (charged area development CAD), depending on the charge of the toner particles, to form the desired toner image on the photoconductor. The toner image is transferred from the photoconductor to an intermediate transfer member and then from the intermediate transfer member to the paper or other print medium.

In one aspect, the present disclosure discloses a charge roller comprising a rubber, said rubber being obtainable by curing a composition comprising:
- a terpolymer of epichlorohydrin/ethylene oxide/allyl glycidyl ether,
- a lithium salt, and
- carbon black, wherein said rubber has an impendence at 8 KHz comprised between 10 and 20 KΩ and a DC resistance comprised between 30 and 50 KΩ when both impendence and resistance are measured by using an electrode of 323 mm long and 2 mm wide and an electrical source of 100V, in a rubber stabilized at 50% relative humidity and 23° C.

In one other aspect, the present disclosure discloses a charge roller comprising a rubber, said rubber being obtainable by curing a composition comprising:
- a terpolymer of epichlorohydrin/ethylene oxide/allyl glycidyl ether which has:
  - an epichlorohydrin content which results in a terpolymer chlorine content comprised between about 18 and 20% by weight over the weight of the terpolymer, an allyl glycidyl ether content comprised between about 6.2 and 8.2% by weight over the weight of the terpolymer, the balance being ethylene oxide, and
  - a Mooney viscosity comprised between about 40 and 54 when expressed as $M_L$ (1'+4') and measured using ASTM D-1646 method
- lithium(bis)trifluoromethanesulfonimide, and
- carbon black, wherein the amount of lithium(bis)trifluoromethanesulfonimide in the composition is comprised between 1 and 4 expressed as weight parts per 100 weight parts of said terpolymer and wherein the amount of carbon black in the composition is comprised between 1 and 4 expressed as weight parts per 100 weight parts of said terpolymer.

The rubber (hereinafter also referred to as "terpolymer-containing rubber") which is obtainable by curing a composition as presently defined can advantageously be used for the manufacture of a conductive layer for charge rollers.

Terpolymer of epichlorohydrin (ECH)/ethylene oxide (EO)/allyl glycidyl ether (AGE) are also known as hydrin(s) or poly(epichlorohydrin-co-ethylene oxide-co-allyl glycidyl ether). Below and unless otherwise indicated, the terms terpolymer and hydrin are interchangeably used. Hydrins are chemically distinct over e.g. epichlorohydrin homopolymer (also known as poly(epichlorohydrin)). The use of a hydrin overcomes the hydrolysis and gelation problems affecting charge rollers comprising polyurethane (hereinafter also PU) rubbers. Various grades of hydrins are commercially available and they can be distinguished over each other either chemically, e.g. by means of the amounts of the different monomers in the final polymer and/or physically, e.g. by reference to hydrin grade viscosity. Regarding the chemical composition of the terpolymer, different methods are known in the field of polymers to define the amounts of the various monomers. For example, the various monomers may be expressed in terms of their mol or weight % with respect to moles or weight of the final terpolymer. Alternatively, for example for epichloridrine, it is possible to indicate the chlorine % by weight with respect to the weight of the terpolymer. Since chlorine derives from inclusion of ECH, its amount is indicative of the amount of ECH present in the terpolymer.

In one embodiment, the terpolymer comprises, or consists of, a hydrin grade which has:
- an epichlorohydrin content which results in a terpolymer chlorine content comprised between about 18 and 20% by weight over the weight of the terpolymer, an allyl glycidyl ether content comprised between about 6.2 and 8.2% by weight over the weight of the terpolymer, the balance being ethylene oxide, and
- a Mooney viscosity comprised between about 40 and 54 when expressed as $M_L$ (1'+4') and measured using ASTM D-1646 method.

This hydrin grade was identified and adopted inter alia because it can dissolve a significant amount of lithium salt, if necessary. This hydrin grade is commercially available as HYDRIN® T3108; from Nippon Zeon Co., Ltd. Besides the above mentioned characteristics, this grade is also technically known (based on information available from manufacturer) to have a particularly high content of ethylene oxide which is about 64 mol %.

In one embodiment, the composition does not comprise:
- a hydrin grade which has an epichlorohydrin content of about 48.8 mol %, allyl glycidyl ether content of 2.4 mol % and ethylene oxide content of about 48.8 mol %, and a Mooney viscosity of about 65 when expressed as $M_L$ (1'+4') and measured using ASTM D-1646 method (this hydrin grade is available as HYDRIN® T65; available from Nippon Zeon Co., Ltd), and/or
- a hydrin grade which has an epichlorohydrin content of about 67 mol %, allyl glycidyl ether content of 8 mol % and ethylene oxide content of about 25 mol %, and a Mooney viscosity of about 72 when expressed as $M_L$ (1'+4') and measured using ASTM D-1646 method (this hydrin grade is available as HYDRIN® T3100; available from Nippon Zeon Co., Ltd), and/or
- a poly(epichlorohydrin) homopolymer, and/or
- a polyurethane polymer.

The lithium salt can be any lithium salt conventionally used as ionic conducting agent for reducing resistivity of rubbers into which it is present. Lithium salts provided superior results when compared to other salts usually used for the same purpose, such as quaternary ammonium salts (e.g. trimethyl-1-octylammonium bromide or ammonium sulfate alkyl chain salts). Accordingly, in one example the composition does not comprise a quaternary ammonium salt, such as an alkyl quaternary ammonium salt.

Additionally, lithium(bis)trifluoromethanesulfonimide (e.g. HQ-115 Fluorad® commercially available from 3M®) provided superior results when compared to other lithium salts, such as lithium perchlorate. Accordingly, in one example the lithium salt comprises, or consists of, lithium (bis)trifluoromethanesulfonimide.

Carbon black can be any carbon black conventionally used as electron conducting agent for optimising impedance of the rubber into which it is present. An example of suitable carbon black is EC300 Black commercially available from Akzo Nobel.

It is advantageous that the electrical performances of a rubber which is obtainable by curing a composition as presently disclosed be as follows:
- impendence at 8 KHz comprised between 10 and 20 KΩ and
- DC (direct current) resistance comprised between 30 and 50 KΩ when impendence and resistance are measured by using an electrode of 323 mm long and 2 mm wide and an electrical source of 100V, in a rubber stabilized at 50% relative humidity and 23° C.

Preferably, a rubber is stabilized upon storage for at least 48 hours at 50% relative humidity and 23° C.

In one embodiment, the amount of lithium salt in the composition is comprised between about 1 and 4, preferably it is about 1.5, expressed as weight parts per 100 weight parts of said terpolymer (hereinafter also "phr").

In one embodiment, the amount of carbon black in the composition is comprised between about 1 and 4, preferably it is about 3, expressed as weight parts per 100 weight parts of said terpolymer.

The co-presence of a lithium salt and carbon black provides for certain advantages. In particular, the dual conductive agent allows flexibility in tailoring both resistance and impedance of the rubber. Achieving repeatability in electrical and physical properties of rubbers containing carbon black is known to be daunting because the resistivity target for charge rollers typically happens to be in the steep section of percolation curve for practically any carbon black. In this section of the percolation curve, the physical and electrical properties are extremely sensitive to factors such as carbon black loading as well as to its processing. By using a lithium salt and carbon black, it is possible to keep the carbon black loading below the percolation limit and then use the lithium salt to adjust the resistance to the desired target level thereby providing a robust solution.

The resistance and impedance at 8 KHz of charge rollers as presently disclosed make them particularly suitable for performing liquid electro-photograph processes, particularly high speed liquid electro-photograph processes. Also, the electrical performances of the charge rollers as presently disclosed were found to contribute to a repeatable and reproducible roller charging performances and lead to uniformly charged surface of a photo-conductor to high voltages typically used in last-generation LEP processes (e.g. equal to 1050V±1%).

Additionally, since lithium salts are not soluble in hydrocarbon oils conventionally used as image oils (e.g. Isopar®-L), the risk that the photo-conductor surface be contaminated or that the lithium salts leak out from the charge roller leading to a rapid deterioration of the electrical performances has been overcome. This provides for a full chemical and physical compatibility of charge rollers as presently defined with the characteristics of the inks typically used in liquid electro-photograph processes.

In one example the composition does not comprise any blowing agent and/or blowing aid.

In one embodiment, the composition further comprises a sulfur donor, a curing activator and a curing accelerator. In one example:
  the sulphur donor comprises, or consists of, a dispersion of 70% w/w 4,4'-dithiodimorpholine in a polymer-based binder, preferably in bead form;
  the curing activator comprises, or consists of,
    zinc oxide in powder form and
    stearic acid, and
  the curing accelerator comprises, or consists of,
    2,2'-dithiobis(benzothiazole),
    tetramethylthiuram monosulfide and
    a dispersion of 75% w/w of zinc dimethylthiocarbamate in a polymer-based binder, preferably in bead form.

A suitable sulphur donor in bead form is commercially available as PB(DMDS)-75 from RheinChemie. A suitable zinc oxide in powder form is commercially available as zinc oxide grade AZ066 from U.S. Zinc. A suitable 2,2'-dithiobis(benzothiazole) is commercially available as MBTS powder from Akrochem. A suitable tetramethylthiuram monosulfide is commercially available as TMTM powder from Akrochem. A suitable dispersion of 75% w/w of zinc dimethylthiocarbamate in a polymer-based binder in bead form is commercially available as PB(ZDMC)-75 from RheinChemie.

In one example the composition does not comprise any sulfur donor, curing activator and curing accelerator other than those indicated above.

A combination of sulfur donor, curing activator and curing accelerator as defined above has been found not to contaminate a photo-conductor (PIP) due to e.g. its interaction (e.g. leaching out) with the image oil. In effect, none of sulfur donor, curing activator and curing accelerator as defined above is soluble in hydrocarbon oils typically used as image oils such as Isopar®-L.

In one embodiment, the rubber comprised in a charge roller as presently defined has a Shore-A hardness comprised between 35 and 45 using ASTM D-2240 method. The charge roller can therefore withstand usage and maintain appropriate performances in repeated printing. The above hardness may preferably be obtained by using a composition which comprises a hydrin, a lithium salt, carbon black, a sulphur donor, a curing activator and a curing accelerator as defined above.

In one embodiment, the rubber is obtainable by curing a composition comprising, or consisting of:
  a terpolymer of epichlorohydrin/ethylene oxide/allyl glycidyl ether which has an epichlorohydrin content which results in a terpolymer chlorine content comprised between 18 and 20% w/w, an allyl glycidyl ether content comprised between 6.2 and 8.2% w/w, the balance being ethylene oxide, and a Mooney viscosity comprised between 40 and 54 when expressed as $M_L$ (1'+4') and measured using ASTM D-1646 method;
  stearic acid in an amount of 0.5 weight parts per 100 terpolymer weight parts;
  zinc oxide in powder form in an amount of 3 weight parts per 100 terpolymer weight parts;
  a dispersion of 75% w/w of zinc dimethylthiocarbamate in a polymer-based binder, in an amount of 1.2 weight parts per 100 terpolymer weight parts;
  tetramethylthiuram monosulfide in an amount of 0.4 weight parts per 100 terpolymer weight parts;
  dithiobis(benzothiazole) in an amount of 1 weight parts per 100 terpolymer weight parts;
  a dispersion in the form of beads of 70% w/w 4,4'-dithiodimorpholine in a polymer-based binder, in an amount of 1.75 weight parts per 100 terpolymer weight parts;
  lithium(bis)trifluoromethanesulfonimide in an amount of 1.5 weight parts per 100 terpolymer weight parts, and
  carbon black in an amount of 3 weight parts per 100 terpolymer weight parts.

In one example, a charge roller comprises a conductive inner shaft (typically made of steel or aluminium), a conductive layer comprising a terpolymer-containing rubber as defined above, said layer being disposed about said shaft and extending along at least a portion of the length of said shaft. It is advantageous that said layer has an outer longitudinal surface further provided with a coating comprising a semi-conductive rubber. Any known rubber coating can be presently used. Typical coatings comprise a rubber which is semi-conductive, i.e. a rubber that has a conductivity which is lower than the conductivity of the terpolymer-containing rubber as defined above and used for the (coated) conductive layer.

In one other aspect, the present disclosure discloses an apparatus for forming an image through a liquid electrophotograph process, said apparatus comprising a charge roller as defined above and a photoconductor (such as a photoconductive-layer on a drum).

In one embodiment, the apparatus further comprises a toner cartridge. In this case, it is preferred that a charge roller as presently defined be used as a physically separated and independently replaceable maintenance with respect to the toner cartridge.

In one embodiment, the apparatus further comprises charging means configured to supply said charging roller with AC voltage.

In another aspect, the present disclosure discloses a method for the manufacture of a charge roller as defined above, said method comprising the step of curing a composition as defined above, and wherein said curing comprises subjecting said composition to a temperature comprised between 140 and 160° C. for a time comprised between 5 and 10 hours, preferably to a temperature of about 150° C. for no more than 9 hours, preferably for a time comprised between 5 and 9 hours.

In one embodiment the method comprises the following steps:
  a) providing a composition as defined above,
  b) molding the composition into a mold wherein a conductive shaft has been pre-installed,
  c) curing the molded composition to a temperature comprised between 140 and 160° C. for a time comprised between 5 and 10 hours thereby obtaining a charge roller.

In one embodiment the method further comprises one or more of the following steps: grinding the roller to a desired dimension specification, coating the roller with a rubber coating, curing the rubber coating, inspecting the final roller.

Preferably, the steps of the method are carried out in the order in which they are presented.

Any curing step may be carried out in ovens.

The above has been found a robust method for the manufacture of a charger roller which provides for manufacture repeatability.

Figure 1:
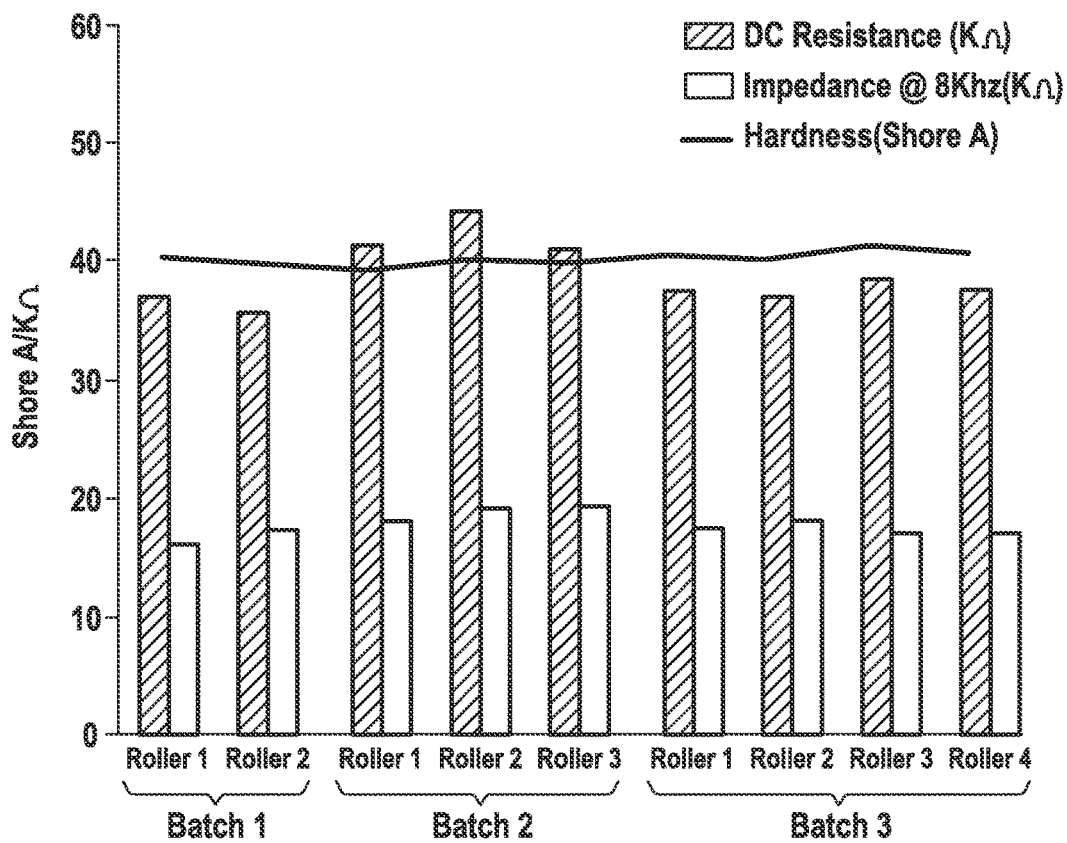
FIG. 1 shows Shore-A hardness, resistance, and AC impedance at 8 KHz (charging frequency) from three batches of hydrin charge rollers according to embodiments of the invention.
Figure 2:
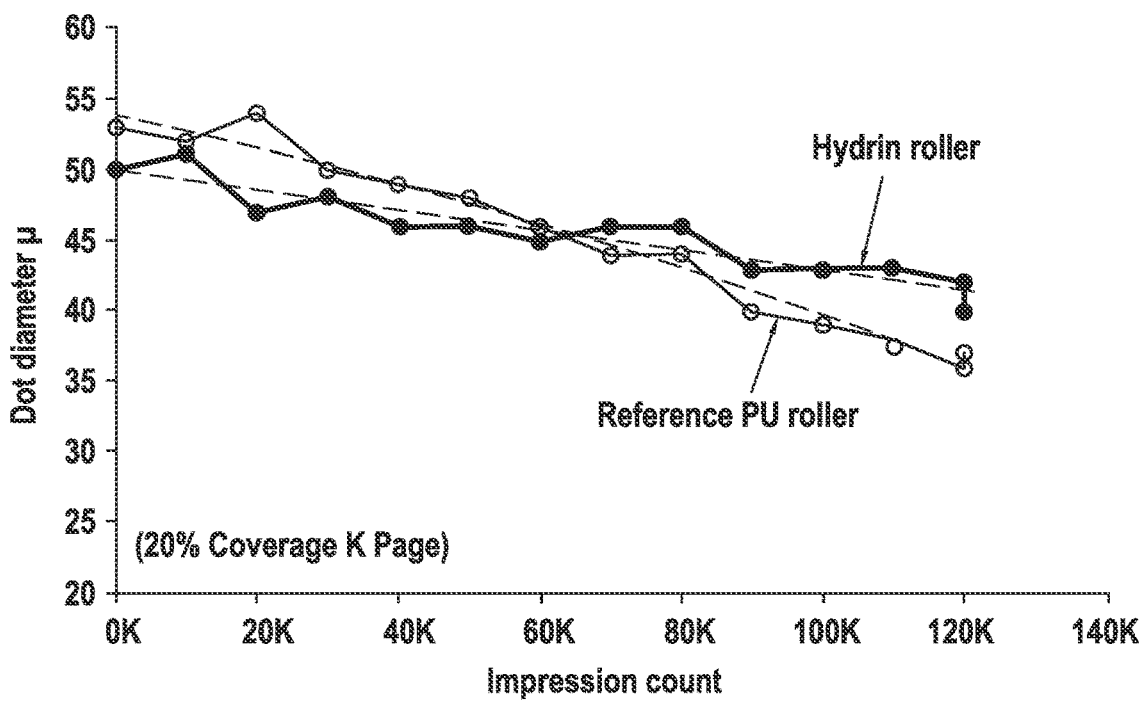
FIG. 2 compares a hydrin charge roller according to an embodiment the invention vs. a conventional polyurethane (PU) charge roller in terms of leaching components onto photo-conductor (PIP) in the normal printing environment. Leached components affect dot quality.
Figure 3:
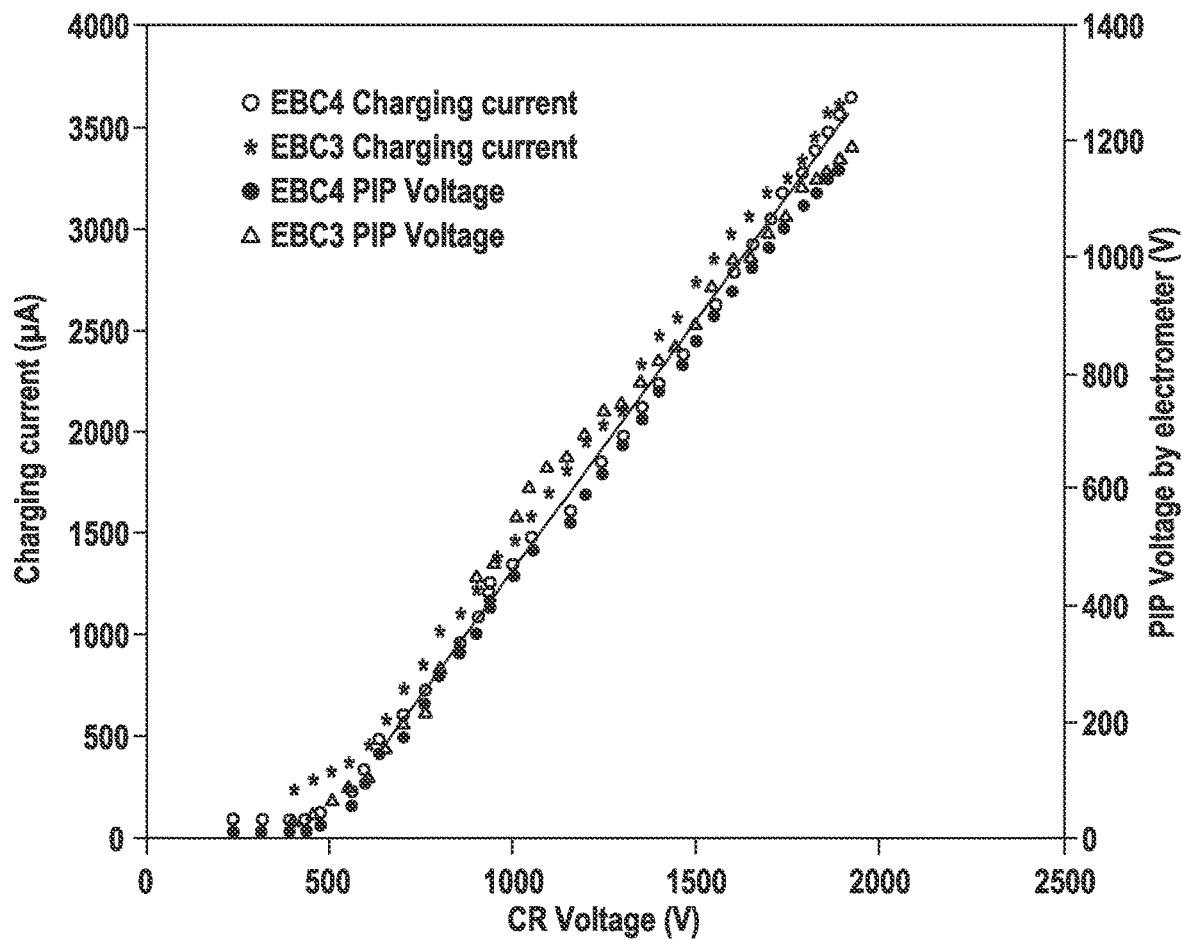
FIG. 3 shows I-V curves for two hydrin rollers (EBC3 and EBC4) according to an embodiment of the invention. The I-V curve characterizes the electrical behaviours of a charge roller. In the x-axis is the applied DC voltage to the charge rollers, and in y-axis are their charging currents on the left. On the right y-axis, are the surface voltages of the photo-conductor (or PIP) after charging as measured by an electrometer. The Paschen breakdown occurs at 470V applied voltage and above. Working point is at CR–V=1740 V, CR–I=3.18 mA, PIP–V=1050V.
Figure 4:
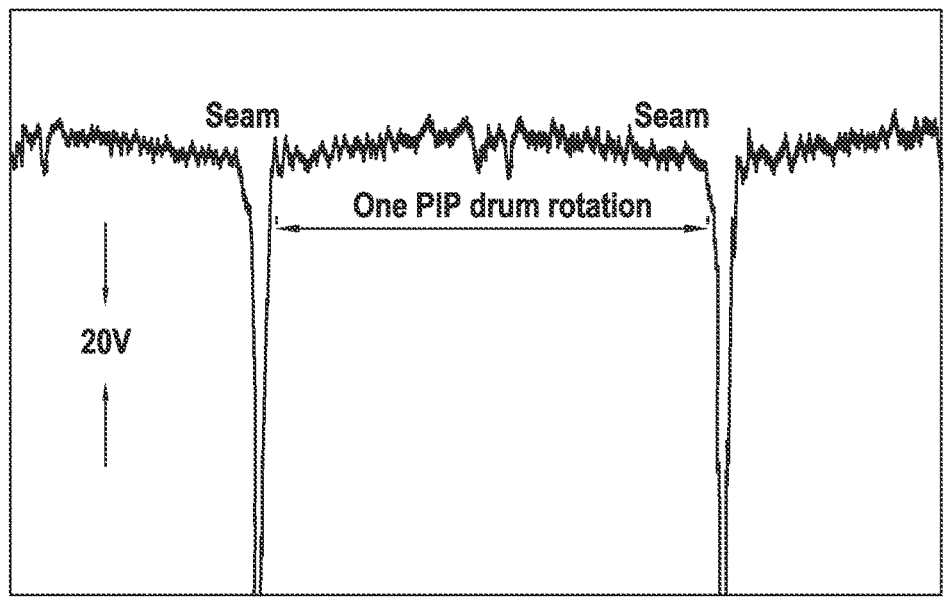
FIG. 4 is a screen capture of the electrometer measuring the surface voltage of a photo-conductor (PIP) along the rotational direction of the PIP drum under the normal printing conditions. The PIP is charged using a charge roller according to an embodiment of the invention. Between the two seams in the graph is one revolution of the PIP drum, and the image zone is within the flat area between the two seams.

The advantages of the present invention are multiple and include for example:
  Manufacture repeatability: as shown in FIG. 1 Shore-A hardness, resistance, and AC impedance at 8 KHz (charging frequency) were all very repeatable indicating a solution that is robust for manufacturing;
  Comparable or reduced contamination of the photo-conductor with respect to conventional PU charge rollers: the leaching components of the roller degrade performance of the photo conductor resulting in dot size reduction over the life of photo-conductor in this print mode. FIG. 2 clearly shows that the hydrin rollers according to embodiments of the invention performed equally or better than the reference PU charge roller;
  Charging Performance: as shown in FIG. 3 both charging current and surface voltage of a photo-conductor charged with a charge roller according to an embodiment of the invention have a linear relationship with the applied voltage above Paschen breakdown. The operating charging level of 1050V is achieved with an applied DC voltage of 1740V. This shows the achievement of a desirable high performance in photo-conductor charging;
  Charging uniformity: FIG. 4 clearly shows that when a charge roller according to an embodiment of the invention is coupled with a PIP, the total peak to peak variation of PIP surface voltage is below 15V inside the image zone. This result is meeting a desirable charging uniformity requirement of 1050V±1%;
  Life Span: from the eight rollers according to embodiments of the present invention and tested for life span, the average age reached 1.2 million impressions with only one roller failed at 3 million impressions.

In one aspect, the present disclosure discloses the use of a combination of carbon black and a lithium salt as conductive agent in an epichlorohydrin/ethylene oxide/allyl glycidyl ether terpolymer-containing rubber.

All characteristics and embodiments that for the sake of conciseness are disclosed above with respect to a single aspect are to be considered as applicable to the other aspects presently disclosed as far as they are technically compatible therewith. For example, characteristics and embodiments of lithium salt, carbon black and terpolymer as discussed above in connection with a charge roller equally apply to the use of a combination of carbon black and a lithium salt as conductive agent in an epichlorohydrin/ethylene oxide/allyl glycidyl ether terpolymer-containing rubber.

Further embodiments and advantages of the present invention will become apparent to a skilled reader in light of the examples provided below.

EXAMPLES

Hydrin charge rollers of FIG. 1 to FIG. 4 all comprised a rubber obtained by curing the following composition:

| Material Name | Load (phr) |
| --- | --- |
| Hydrin T3108-62 | 100 |
| Stearic acid F2000 | 0.50 |
| Zinc oxide AZO66 | 3.00 |
| PB(ZDMC)-75 | 1.20 |
| Akrokem TMTM Powder | 0.40 |
| Akrokem MBTS | 1.00 |
| PB(DMDS)-75 | 1.75 |
| HQ-115 | 1.50 |
| EC300 Black | 3.00 |
| TOTAL | 112.35 |

Charge rollers of FIG. 2 to FIG. 4 were further coated.

The comparative charge rollers were the coated PU (polyurethane) rubber-based rollers commercialized in current HP Indigo® 7000 and WS6000 press.

The invention claimed is:
1. A charge roller comprising a rubber, said rubber being obtainable by curing a composition comprising:
  a terpolymer of epichlorohydrin/ethylene oxide/allyl glycidyl ether which has:
    an epichlorohydrin content which results in a terpolymer chlorine content comprised between about 18 and 20% by weight over the weight of the terpolymer, an allyl glycidyl ether content comprised between about 6.2 and 8.2% by weight over the weight of the terpolymer, the balance being ethylene oxide, and
    a Mooney viscosity comprised between about 40 and 54 when expressed as $M_L$ (1'+4') and measured using ASTM D-1646 method,
  lithium(bis)trifluoromethanesulfonimide,
  carbon black,
  a curing activator comprising: stearic acid in an amount of 0.5 weight parts per 100 terpolymer weight parts, and zinc oxide in powder form in an amount of 3 weight parts per 100 terpolymer weight parts, a curing accelerator comprising: a dispersion of 75% w/w of zinc dimethylthiocarbamate in a polymer-based binder in an amount of 1.2 weight parts per 100 terpolymer weight parts, tetramethylthiuram monosulfide in an amount of 0.4 weight parts per 100 terpolymer weight parts, and 2, 2'-dithiobis(benzothiazole) in an amount of 1 weight parts per 100 terpolymer weight parts, and a sulfur donor comprising: a dispersion in the form of beads of 70% w/w 4,4'-dithiodimorpholine in an amount of 1.75 weight parts per 100 terpolymer weight parts, wherein the amount of lithium(bis)trifluoromethanesulfonimide in the composition is comprised between 1 and 4 expressed as weight parts per 100 weight parts of said terpolymer, wherein the amount of carbon black in the composition is comprised between 1 and 4 expressed as weight parts per 100 weight parts of said terpolymer, and wherein the rubber has an impedance at 8 KHz comprised between 10 and 20 KΩ and a DC resistance comprised between 30 and 50 KΩ when both impedance and resistance are measured by using an electrode of 323 mm long and 2 mm wide and an electrical source of 100V, in a rubber stabilized at 50% relative humidity and 23° C.

2. The charge roller according to claim 1, wherein the rubber has a Shore-A hardness comprised between 35 and 45 using ASTM D-2240 method.

3. The charge roller according to claim 1, comprising an inner conductive shaft, a conductive layer comprising the rubber, said layer being disposed about said shaft and extending along at least a portion of the length of said shaft.

4. The charge roller according to claim 3, further comprising a semi-conductive rubber coating coated on the conductive layer, wherein a conductivity of the semi-conductive rubber coating is lower than a conductivity of the conductive layer.

5. The charge roller according to claim 1, wherein the lithium(bis)trifluoromethanesulfonimide is present in an amount of 1.5 weight parts per 100 terpolymer weight parts.

6. The charge roller according to claim 1, wherein the carbon black is present in an amount of 3 weight parts per 100 terpolymer weight parts.

7. The charge roller according to claim 1, wherein the dispersion of 75% w/w of zinc dimethylthiocarbamate in a polymer-based binder is in bead form.

8. The charge roller according to claim 1, wherein the composition consists of the terpolymer, the lithium(bis)trifluoromethanesulfonimide, the carbon black, the curing activator, the curing accelerator, and the sulfur donor.

9. An apparatus for forming an image through a liquid electro-photograph process, said apparatus comprising a charge roller as defined in claim 1, and a photoconductor.

10. The apparatus according to claim 9, further comprising a toner cartridge and wherein said cartridge and said charge roller are physically separated and independently replaceable maintenance parts.

11. A method for the manufacture of a charge roller according to claim 1, said method comprising the step of curing the composition, and wherein said curing comprises subjecting said composition to a temperature comprised between 140° C. and 160° C. for a time comprised between 5 and 10 hours.

12. A method of using a combination of carbon black and a lithium salt as conductive agent in a rubber composition containing an epichlorohydrin/ethylene oxide/allyl glycidyl ether terpolymer, a sulfur donor, a curing activator, and a curing accelerator, the method comprising:

mixing the carbon black, the lithium salt, the epichlorohydrin/ethylene oxide/allyl glycidyl ether terpolymer to form the rubber composition, wherein the lithium salt is lithium(bis)trifluoromethanesulfonimide, wherein the epichlorohydrin/ethylene oxide/allyl glycidyl ether terpolymer comprises:

an epichlorohydrin content which results in a terpolymer chlorine content comprised between about 18 and 20% by weight over the weight of the terpolymer, an allyl glycidyl ether content comprised between about 6.2 and 8.2% by weight over the weight of the terpolymer, the balance being ethylene oxide, and a Mooney viscosity comprised between about 40 and 54 when expressed as $M_L$ (1'+4') and measured using ASTM D-1646 method, wherein the amount of lithium(bis)trifluoromethanesulfonimide in the composition is comprised between 1 and 4 expressed as weight parts per 100 weight parts of said terpolymer, wherein the amount of carbon black in the composition is comprised between 1 and 4 expressed as weight parts per 100 weight parts of said terpolymer wherein the curing activator comprises: stearic acid, which is present in an amount of 0.5 weight parts per 100 terpolymer weight parts, and zinc oxide in powder form, which is present in an amount of 3 weight parts per 100 terpolymer weight parts, wherein the curing accelerator comprises: a dispersion of 75% w/w of zinc dimethylthiocarbamate, which is present in a polymer-based binder in an amount of 1.2 weight parts per 100 terpolymer weight parts, tetramethylthiuram monosulfide, which is present in an amount of 0.4 weight parts per 100 terpolymer weight parts, and 2,2'-dithiobis(benzothiazole), which is present in an amount of 1 weight parts per 100 terpolymer weight parts, and wherein the sulfur donor comprises: a dispersion in the form of beads of 70% w/w 4,4'-dithiodimorpholine, which is present in an amount of 1.75 weight parts per 100 terpolymer weight parts; and curing the rubber composition, wherein the rubber has an impedance at 8 KHz comprised between 10 and 20 KΩ and a DC resistance comprised between 30 and 50 KΩ when both impedance and resistance are measured by using an electrode of 323 mm long and 2 mm wide and an electrical source of 100V, in a rubber stabilized at 50% relative humidity and 23° C.

13. The method of claim 12, wherein said rubber has an impedance at 8 KHz comprised between 10 and 20 KΩ and a DC resistance comprised between 30 and 50 KΩ when both impedance and resistance are measured by using an electrode of 323 mm long and 2 mm wide and an electrical source of 100 V, in a rubber stabilized at 50% relative humidity and 23° C.

* * * * *